US006136210A

United States Patent [19]

[11] Patent Number: 6,136,210
[45] Date of Patent: Oct. 24, 2000

Biegelsen et al.

[54] PHOTOETCHING OF ACOUSTIC LENSES FOR ACOUSTIC INK PRINTING

[75] Inventors: David K. Biegelsen, Portola Valley; Scott A. Elrod, La Honda; Raj B. Apte; Donald Smith, both of Palo Alto, all of Calif.

[73] Assignee: Xerox Corporation, Stamford, Conn.

[21] Appl. No.: 09/184,483

[22] Filed: Nov. 2, 1998

[51] Int. Cl.[7] .......... C03C 15/00

[52] U.S. Cl. .......... 216/26; 216/27; 216/65; 216/66; 216/80; 216/94; 216/97

[58] Field of Search .......... 216/24, 26, 27, 216/45, 56, 65, 66, 80, 94, 97; 438/27, 29, 42, 71, 708, 709, 746; 65/31; 347/54

[56] References Cited

U.S. PATENT DOCUMENTS

| | | | |
|---|---|---|---|
| 3,954,534 | 5/1976 | Scifres et al. | 156/7 |
| 4,183,780 | 1/1980 | McKenna et al. | 156/643 |
| 4,260,649 | 4/1981 | Denison et al. | 427/53.1 |
| 4,391,683 | 7/1983 | Buckley et al. | 204/129.3 |
| 4,478,677 | 10/1984 | Chen et al. | 216/80 |
| 4,705,593 | 11/1987 | Haigh et al. | 156/635 |
| 4,782,350 | 11/1988 | Smith et al. | 346/140 R |
| 4,842,782 | 6/1989 | Portney et al. | 264/1.4 |
| 5,028,937 | 7/1991 | Khuri-Yakub et al. | 346/140 R |
| 5,041,849 | 8/1991 | Quate et al. | 346/140 R |
| 5,122,818 | 6/1992 | Elrod et al. | 346/140 R |
| 5,229,793 | 7/1993 | Hadimioglu et al. | 346/140 R |
| 5,316,640 | 5/1994 | Wakabayashi et al. | 204/192.34 |
| 5,456,798 | 10/1995 | Koumura et al. | 216/66 |
| 5,565,113 | 10/1996 | Hadimioglu et al. | 216/2 |
| 5,591,490 | 1/1997 | Quate et al. | 427/457 |
| 5,705,079 | 1/1998 | Elledge | 216/24 |
| 5,919,607 | 7/1999 | Lawandy | 216/24 |

FOREIGN PATENT DOCUMENTS

| | | | |
|---|---|---|---|
| 2671430 A1 | 7/1992 | France | 216/65 |
| 60-155552 | 8/1985 | Japan . | |
| 61-37981 | 2/1986 | Japan | 216/65 |
| 61-48581 | 3/1986 | Japan | 216/65 |
| 62-111433 | 5/1987 | Japan | 216/66 |
| 4-287320 | 10/1992 | Japan | 216/66 |
| 2234631 | 2/1991 | United Kingdom | 216/65 |

OTHER PUBLICATIONS

J. Steinfeld, et al., "Surface Etching by Laser–Generated Free Radicals", *Journal of the Electrochemical Society*, vol. 127, No. 2, pp. 514–515. Feb. 1980.

T.J. Chuang, "Laser–Enhanced Chemical Etching of Solid Surfaces", *Journal of the Electrochemicl Society*, vol. 127, No. 2, pp. 145–150. Feb. 1980.

*Primary Examiner*—Randy Gulakowski
*Assistant Examiner*—Anita Alanko
*Attorney, Agent, or Firm*—Fay, Sharpe, Fagan, Minnich & McKee, LLP

[57] ABSTRACT

A method of fabricating a lens comprising providing a photosoluble substrate having opposed first and second surfaces; exposing one of the surfaces of the substrate to a photoactive etchant; and exposing said etchant to patterned light such that a convex or concave, generally semi-spherical bulge or recess is formed in said substrate.

17 Claims, 1 Drawing Sheet

PHOTOETCHING OF ACOUSTIC LENSES FOR ACOUSTIC INK PRINTING

This invention relates generally to acoustic ink printing (AIP) and more particularly to an improved acoustic lens for AIP. In addition, the present invention is directed to an improved process for the manufacture of acoustic lenses, and in fact, lenses for a variety of applications.

AIP is a method for transferring ink directly to a recording medium having several advantages over other direct printing methodologies. One important advantage is that it does not need nozzles and ejection orifices that may cause many of the reliability (e.g. clogging) and picture element (i.e. pixel) placement accuracy problems which conventional drop on demand and continuous stream ink jet printers have experienced. Since AIP avoids the clogging and manufacturing problems associated with drop on demand, nozzle based ink jet printing, it represents a promising direct marking technology. In general, the process is generally directed to utilization of bursts of focused acoustic energy to emit droplets from a free surface of a liquid on to a recording medium. A more detailed description of the AIP process can be found in U.S. Pat. Nos. 4,308,547; 4,696,195; 4,697,195; 4,719,476; 4,719,480; 4,751,530; 4,751,529; 4,797,693; 4,908,638; 4,959,674; 5,028,937; 5,041,849; 5,087,931; 5,111,220; 5,121,141; 5,122,818; 5,142,307; 5,194,880; 5,216,452; 5,231,426; 5,268,610; 5,277,754; 5,287,126; 5,339,101; 5,389,456; 5,392,064; 5,428,381; 5,541,627; 5,591,490; 5,631,678; and 5,686,945, each of which is hereby incorporated by reference.

To be competitive with other printer types, acoustic ink printers must produce high quality images at low cost. To meet such requirements, it is advantageous to fabricate printheads with a large number of individual droplet emitters. While specific AIP implementations may vary, and while additional components may be used, each droplet emitter will include an ultrasonic transducer (attached to one surface of a body), an activator for switching the droplet emitter on or off, an acoustic lens, and a cavity holding ink such that the ink's free surface is near the acoustic focal area of the acoustic lens. The individual droplet emitter is activated by the appropriate selection of the associated row and column of the array.

Traditionally, a fresnel lens has been used in the AIP process. For example, fresnel lenses, their manufacture and printheads manufactured therefrom are described in U.S. Pat. Nos. 5,041,849 and 5,278,028, each of which is herein incorporated by reference. While fresnel lenses have proven generally satisfactory, an improved acoustic lens approaching a more perfect semi-spherical form and, of course, a process for its manufacture would be desirable.

SUMMARY OF THE INVENTION

Accordingly, it is a primary advantage of this invention to provide a new and improved acoustic lens.

A further advantage of this invention is to provide a new and improved process for the manufacture of an acoustic lens.

An additional advantage of this invention is to provide a new and improved process for the manufacture of any type of lens.

It is a still further advantage of this invention to provide a new and improved printhead for an AIP system.

Additional advantages of the invention will be set forth in part in the description which follows and in part will be obvious from the description or may be learned by practice of the invention. The advantages of the invention may be realized and attained by means of the instrumentalities and combinations, particularly pointed out in the appended claims.

To achieve the foregoing in accordance with the purpose of the invention, as embodied and broadly described herein, the acoustic lens of this invention comprises a first layer of a photosoluble material including a generally concave parabolic recess, an acoustic wave generating element, and a source which activates the wave generating element. In addition, the present invention is directed to a method of manufacturing the lens comprising photoetching of a layer of material. Advantageously, the photoetching process can use incoherent or laser light. The light may be intensity modulated or intensity modified. Similarly, the etchant materials may be dry, wet or liquid. In this context, "dry" etching generally refers to a gas phase wherein wetting of the photoetch material does not occur while "wet" etching refers to a liquid or vapor phase wherein at least a molecular coating of the photoetch material occurs. Preferably, when incoherent light is used, the invention will utilize an overlayer or mask to control the etching process. The invention is adaptable to both front or back side light exposure. In a particularly preferred form of the invention, a reflow procedure will be utilized to smooth the etched parabolic recess.

BRIEF DESCRIPTION OF THE DRAWINGS

The invention consists in the novel parts, construction, arrangements, combinations and improvements shown and described. The accompanying drawings, which are incorporated in and constitute a part of the specification illustrate one embodiment of the invention, and together with the description, serve to explain the principles of the invention.

Of the drawings.

DETAILED DESCRIPTION OF THE INVENTION

Reference will now be made in detail to the present preferred embodiment of the invention, an example of which is illustrated in the accompanying drawings. The invention and associated inventive procedure of manufacture will be described in connection with a preferred embodiment/procedure. It will be understood that it is not intended to limit the invention to the particular embodiment/procedure. On the contrary, it is intended to cover all alternatives, modifications and equivalents as may be included within the spirit and scope of the invention defined by the appended claims.

Figure 1:
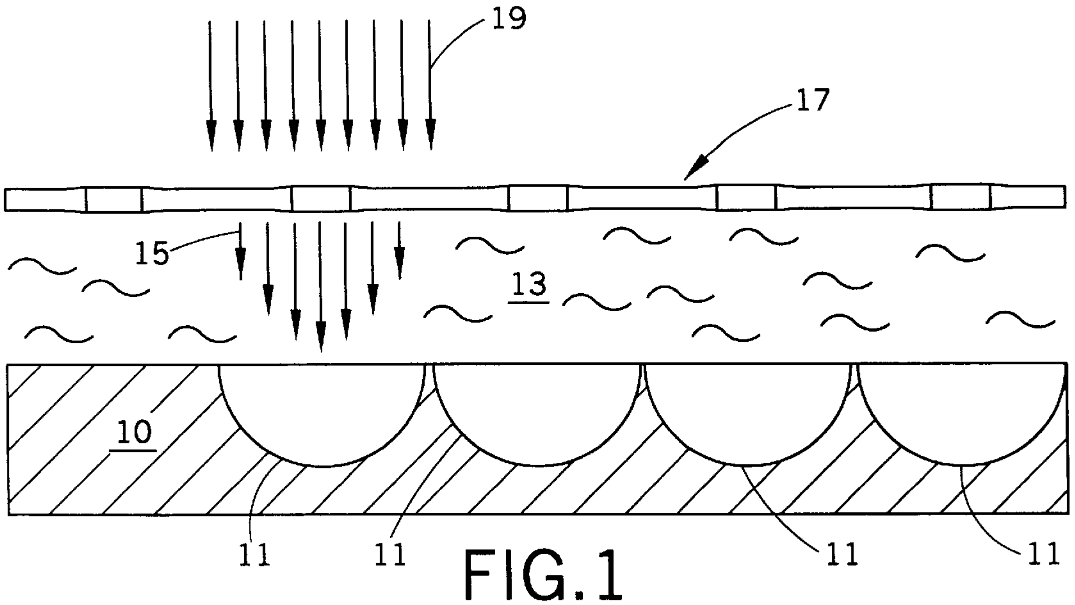
FIG. 1 is a schematic representation of a representative etching procedure.

Referring now to FIG. 1, the general inventive procedure is demonstrated wherein a substrate 10 is provided and shaped, generally parabolic, lens recesses 11 are etched therein. Particularly, an etching solution 13 is provided above substrate 10 and exposed to a patterned light 15 created with mask 17 from collimated light source 19. Generally, the mask will be formed of chrome on glass, however many suitable combinations will be known to those skilled in the art. In the absence of the light the etch rate is negligible compared to the rate in the presence of the light. In this manner, a finished substrate including columns and rows of aligned lenses can be formed.

Figure 2:
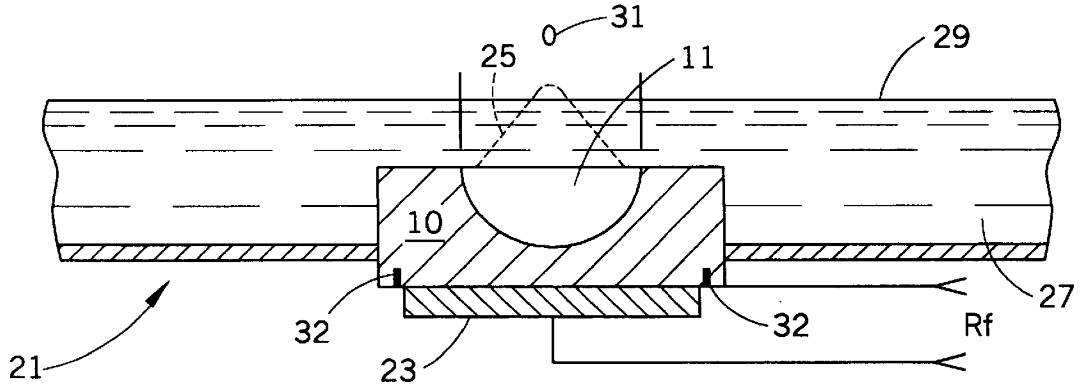
FIG. 2 is an enlarged sectional view of a printhead including the present inventive lens.

Referring now to FIG. 2, each lens is addressed with an individual acoustic generation means for assembly into an AIP printhead 21. A particularly preferred acoustic generation means includes a thin film piezoelectric transducer 23 which is in electrical connection with an rf drive voltage (source not shown). In operation, lens 11 launches a converging acoustic beam 25 into a pool of ink 27. The focal length of the lens 11 is designed so that the beam 25 comes to focus on or near the free surface 29 of the pool 27, thereby ejecting droplet 31 of ink on demand.

In a particularly preferred form of the invention, the substrate 10 is comprised of a photosoluble glass, metal oxide doped silica such as Corning 1737, a metal oxide, a plastic or any other material known to one skilled in the art. The two primary requirements are that the material have (i) an acoustic velocity approximately 5 times greater than the liquid of the pool, and (ii) be photoetchable. A particular advantage of the present invention, when the parabolic shaped lens is used, is that the non-spherical shapes allow lower velocity ratios, e.g. 2×, to be used.

The invention is not particularly limited with respect to the type of photoetching system used. More particularly, the invention is suitable for use with coherent or incoherent light and collimated or focussed light. In this regard, the procedure can be performed with an incoherent broad beam collimated light in combination with a mask or in the absence of a mask by using a spatially-scanned, intensity modulated laser. In addition, the UV radiation exposure can be performed from a front side of the substrate or the back side of the substrate, if the substrate is transparent to the UV.

With respect to the etching system, gas, vapor or liquid etching can be used. A continuous gas flow is preferred with the gas/vapor and if liquid is opted for, slight vibration can be imparted to the substrate to provide greater uniformity for etching. A variety of excellent examples of etching systems suitable to the present invention exist. For example, U.S. Pat. No. 4,478,677, herein incorporated by reference, teaches a laser dry etching of glass with a non-contacting mask. In this apparatus a housing, including a vacuum chamber which receives the substrate to be etched is provided. A vacuum pump is used to pull a vacuum in the chamber and a halogen based gas is introduced into the chamber. This halogen based gas is capable of forming a glass etching species when activated by light. A light source for transmitting a light beam of a predetermined wave length and intensity through the gas is also provided. A mask is optically coupled to the light source for patterning the light beam to provide the desired excitation of the halogen etching gas on the substrate. The preferred etching gas is xenon difluoride. The light source is stated to be either a carbon dioxide laser or an excimer laser. Of course, the system can be modified by utilization of a contacting mask (i.e., one formed in proximity to the etching substrate) or any other means known to one skilled in the art.

An additional system suitable for use with the present invention and herein incorporated by reference, is described in U.S. Pat. No. 4,183,780 wherein a vacuum chamber is provided within which a substrate to be etched is housed. A vacuum is created and a plasma containing a reactive ion etching species such as $O_2$, $F_2$ or stable organic halides such as $CF_4$ is introduced. In this system, a repetitive discharge source creates an ultraviolet light having a continuing wave length range of 600 to 1,000 angstroms is provided.

Other systems suitable to the present invention are described in U.S. Pat. Nos. 4,705,593 and 5,705,079, herein incorporated by reference, wherein methods for forming wave guide devices, detectors, and lasers and spacers on a flat panel display are disclosed, respectively.

Further descriptions of photoetching processes suitable for use in the present invention are provided in the articles *Surface Etching by Laser Generated Free Radicals* by Steinfeld, et al., Volume 127, Number 2 Surface Etching, 514 and *Laser Enhanced Chemical Etching Cell Surfaces,* T. J. Chuang, Journal RES. Develop. Line 26, Number 2, March, 1982, 145, each of which is herein incorporated by reference.

In a preferred form of the invention, the substrate is a photoetchable glass. Photoetchable glass is preferably a photosensitive amorphous glass-type formed by adding a metallic ion, and sensitizer to a silicate glass. Such glass, when exposed to ultraviolet light and heat treated, produces a metal colloid with crystalline nuclei. The crystal structure is extremely fine making the glass easily dissolvable in acid. This also follows for the etching to finally defined structures. Examples of such glass are Corning 1737, FOTURAN made by the optical division of Schott Glaswreke of Mainz, Germany and PEG 3 made by the optical division of Hoya Corporation of Tokyo, Japan.

It should be noted that the skilled artisan will recognize that the etching process is highly controlled by temperature and pressure. Accordingly, variation of these parameters of the system will allow the practitioner to tailor the process to achieve the desirable etching rate and thus lens shape.

Accordingly, the present invention can operate with the following basic systems and variations thereon:

1) front or rear focused or narrow modulated laser (no mask);
2) front or rear lamp or defocused laser with contact mask;
3) front or rear lamp or defocused laser with relieved mask;
4) systems one, two or three with gas/vapor etch; or
5) systems one, two or three with liquid etch.

The preferred process will form a sheet of acoustic lenses suitable for use in an AIP process via a gas phase photoetching with back side U.V. radiation from a spatially-scanned, intensity-modulated laser. The preferred shape of the etched lens is achieved with reference again to FIG. 1, by an intensity modified laser light pattern, having the highest intensity at the desired deepest portion of the lens, and having progressively diminishing intensity outwardly toward the edges of each individual acoustic lens. In this manner, etching is more significant in the central portion to achieve the desired concave parabolic, spherical or other shape.

Figure 3:
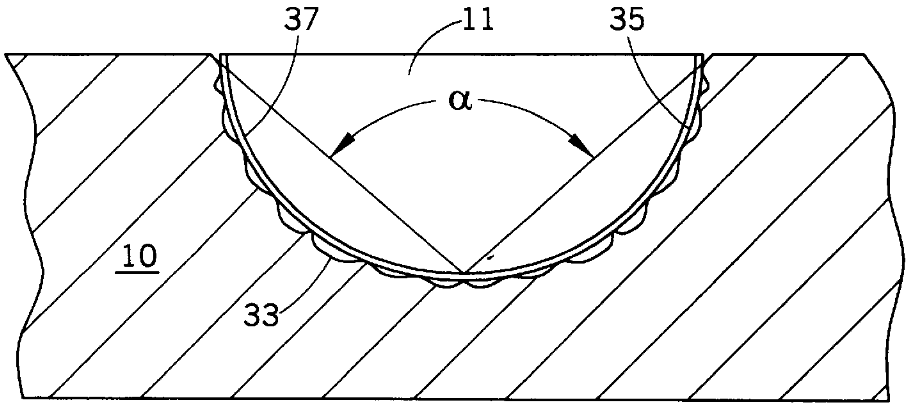
FIG. 3 is an enlarged side elevation view, partially in cross section, of a lens.

Referring now to FIG. 3, the preferred lens shape includes an angle of approximately 80 to 150 determined by the angle. In a particularly preferred form of the invention, the acoustic lens formed by the etching process will be further modified to improve the surface roughness thereof. In this regard, the photoetching process described above does not necessarily yield a perfectly smooth inner surface. For example, a surface 33 may be formed from a first photoetching. Accordingly, a reflow procedure to improve surface roughness may be employed. More particularly, a localized heating/etching procedure could be utilized to remelt/reflow the surface of the formed lens and achieve a roughness of less than One tenth of an acoustic wavelength in the liquid. Similarly, the lens could be coated with a thin layer 35 of a low melting point glass or plastic, and heated to achieve a reflow of the added material. The material should be chosen to have an acoustic impedance, $\rho v$ [where $\rho$ is the material density and v is the acoustic velocity] which closely matches that of the substrate material. Preferably, the added material would have a lower melting temperature than the base substrate material. Surface tension causes a minimization of free surface area and a consequent reduction in surface roughness.

In a particularly preferred embodiment of the invention, an over layer is provided which acts as an acoustic anti-reflective matching layer to suppress unwanted reflections. More specifically, a layer of thickness approximately $\lambda/4$ [where $\lambda$ is an acoustic wavelength] of impedance matching material 37 may be coated on the concave surface of lens 12. The acoustic impedance $\rho v$ of the matching layer should approximate the square root of the product of the impedances of the substrate material and the liquid. Similarly, an overcoat (not shown) having an acoustic impedance and an acoustic velocity intermediate those of the ink and the substrate may be deposited on the concave surface to planarize the printhead. Preferably this overcoat will be selected from the group including parylene and other conformally deposited materials.

A further preferred embodiment of the invention is the use of back side illumination and a mask or a laser modulation which achieves a formation of alignment marks (32; FIG. 3) on the back side of the substrate. In this regard, the alignment marks can be utilized for the appropriate locating of the transducers, generally formed of zinc oxide, at the appropriate location adjacent each of the lenses. Therefore, assembly of the AIP print head is more easily accomplished.

Finally, it is noted that the present invention is not solely limited to the generation of acoustic lenses. More specifically, an array of lenses for focusing light can be produced via the above-described techniques. Of course, a light focusing lens would typically be convex in its formation. Nonetheless, such a result could be readily achieved via the use of a procedure as described above.

Thus, it is apparent that there has been provided, in accordance with the invention, an acoustic lens and a process for its manufacture that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appending claims.

What is claimed:

1. A method of fabricating a lens comprising the steps of providing a photosoluble substrate having opposed first and second surfaces; exposing one of the surfaces of the substrate to a photoactive etchant; exposing said etchant to specifically patterned light such that a controlled convex or concave, generally semi-spherical bulge or recess is formed in said substrate; and performing a reflow of the surface of said bulge or recess.

2. The method of claim 1 wherein said substrate is selected from the group consisting of glass, $SiO_2$, plastic, metal oxides and mixtures thereof.

3. The method of claim 1 wherein said etchant is a gas.

4. The method of claim 3 wherein said etchant is a halogenated hydrocarbon.

5. The method of claim 1 wherein said etchant is a liquid.

6. The method of claim 3 wherein said steps are performed in an otherwise evacuated chamber.

7. The method of claim 1 including the step of applying an overcoat of impedance matching material to said bulge or recess.

8. The method of claim 1 wherein said patterned light is produced by a laser.

9. The method of claim 8 wherein said patterned light is intensity modulated.

10. The method of claim 1 wherein said light is incoherent and patterned via a mask.

11. The method of claim 1 wherein said patterned light originates from a side of said substrate opposed to the surface on which said bulge or recess is formed.

12. The method of claim 1 wherein alignment markings are formed on said surface opposed to said bulge or recess.

13. The method of claim 12 including attachment of a transducer element with the aid of said alignment markings.

14. A method of fabricating a lens comprising the steps of providing a photosoluble substrate selected from the group consisting of glass, $SiO_2$, plastic, metal oxides, and mixtures thereof, said photosoluble substrate having opposed first and second surfaces; exposing one of the surfaces of the substrate to a photoactive etchant; and exposing said etchant to specifically patterned light such that a controlled convex or concave, generally semi-spherical bulge or recess is formed in said substrate.

15. A method of fabricating a lens comprising the steps of providing a photosoluble substrate having opposed first and second surfaces; exposing one of the surfaces of the substrate to a photoactive etchant; exposing said etchant to specifically patterned light such that a controlled convex or concave, generally semi-spherical bulge or recess is formed in said substrate; and applying an overcoat of impedance matching material to said bulge or recess.

16. A method of fabricating a lens comprising the steps of providing a photosoluble substrate having opposed first and second surfaces; exposing one of the surfaces of the substrate to a photoactive etchant; and exposing said etchant to specifically patterned light such that a controlled convex or concave, generally semi-spherical bulge or recess is formed in said substrate, said patterned light originating from a side of said substrate opposed to the surface on which said bulge or recess is formed.

17. A method of fabricating an acoustic ink printhead comprising the steps of fabricating a lens comprising the steps of providing a photosoluble substrate having opposed first and second surfaces;

exposing one of the surfaces of the substrate to a photoactive etchant;

exposing said etchant to specifically patterned light such that a controlled convex or concave, generally semi-spherical bulge or recess is formed in said substrate; and attaching an acoustic transducer to said substrate.

* * * * *